(12) United States Patent
Wygnanski

(10) Patent No.: US 6,598,621 B1
(45) Date of Patent: Jul. 29, 2003

(54) MAGNETIC DRIVES

(75) Inventor: Wladyslaw Wygnanski, Cambridge (GB)

(73) Assignee: Camcon Ltd., Cambridge (GB)

( * ) Notice: Subject to any disclaimer, the term of this patent is extended or adjusted under 35 U.S.C. 154(b) by 0 days.

(21) Appl. No.: 09/807,043

(22) PCT Filed: Oct. 7, 1999

(86) PCT No.: PCT/GB99/03327

§ 371 (c)(1),
(2), (4) Date: Apr. 6, 2001

(87) PCT Pub. No.: WO00/20786

PCT Pub. Date: Apr. 13, 2000

(30) Foreign Application Priority Data

| Apr. 1, 1998 | (GB) | ................................................ 9907552 |
| Oct. 8, 1998 | (GB) | ................................................ 9821842 |
| May 29, 1999 | (GB) | ................................................ 9912518 |
| Jun. 21, 1999 | (GB) | ................................................ 9914330 |

(51) Int. Cl.$^7$ ............................................. F16K 31/08
(52) U.S. Cl. ................... 137/624.18; 137/66; 251/65; 310/15; 310/23
(58) Field of Search ............................. 137/66, 624.18; 251/65; 310/15, 23, 20

(56) References Cited

U.S. PATENT DOCUMENTS

| 2,635,632 | A | * | 4/1953 | Mayer et al. | ............. 137/66 X |
| 3,762,442 | A | * | 10/1973 | Paul | ................... 251/65 X |
| 3,772,540 | A | * | 11/1973 | Benson | .................... 310/14 |
| 4,386,823 | A |   | 6/1983 | Musha | |
| 4,554,610 | A |   | 11/1985 | Metz et al. | |
| 5,051,631 | A | * | 9/1991 | Anderson | .............. 310/23 X |
| 6,454,548 | B2 | * | 9/2002 | Falk et al. | ............... 310/15 X |

FOREIGN PATENT DOCUMENTS

| DE | 33 15 848 | 10/1984 |
| EP | 0 221 228 | 5/1987 |
| EP | 0 704 955 | 4/1996 |

* cited by examiner

*Primary Examiner*—Kevin Lee
(74) *Attorney, Agent, or Firm*—Barnes & Thornburg

(57) ABSTRACT

A magnetic device is formed from a permanent magnet (12, 14) generating magnetic flux, and an armature (10) which can occupy either a first air gap in which the flux is in one direction, or a second air gap in which the flux is in the opposite direction, with a region of flux cancellation between the two air gaps. At least one electromagnet winding (36, 38) may be provided to which current can be supplied which when energised produces a magnetic flux in one direction or the other, depending on the direction of the current, the flux from the winding increasing the flux density in one of the air gaps and reducing the flux density in the other air gap. This effectively shifts the flux cancellation region towards or into one of the two air gaps so as to produce a flux density gradient extending from one air gap to the other, which will cause the armature to move into (or remain in) the air gap having the higher flux density, and continue to remain in that air gap after the current flow ceases. The device can be incorporated into a fluid valve to act as a drive for opening and closing the valve. It may also serve as the drive for opening and closing electrical contacts. Monostable operation can be achieved by locating a magnetic flux shunt at one end of the armature travel. A holding solenoid may be incorporated. A plurality of such devices controlling the opening and closing of a plurality of orifices in a manifold containing fluid especially gas or air, under positive pressure, may be controlled by signals from a computer controlled signal generator to produce an air cushion for supporting and/or conveying articles, or a sound wave whose amplitude and frequency is controlled by the signal generator. Such a device may be incorporated into a pipeline to influence the flow of fluid therethrough or into the exhaust or inlet manifold of a turbine or engine, especially a jet engine, to interact with the gases flowing therethrough and introduce or reduce turbulence or otherwise alter the gas flow.

26 Claims, 10 Drawing Sheets

Safety valve-bistabile mode

Safety valve-mono-stabile mode

Direct driver

Magnetic bridge two magnets position up two magnets position down single magnet position down

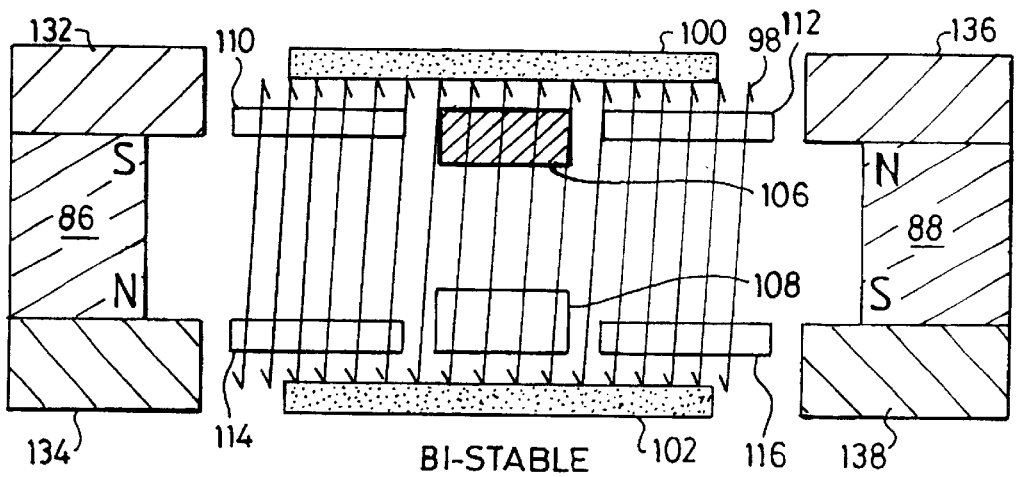
Fig. 14 BI-STABLE
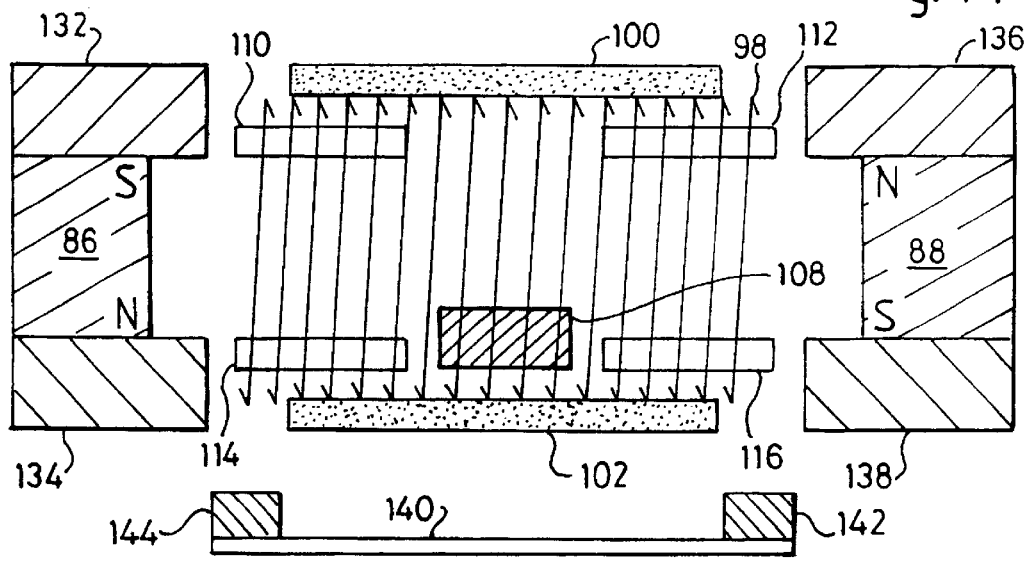
Fig. 15 BI-STABLE SAFETY VALVE
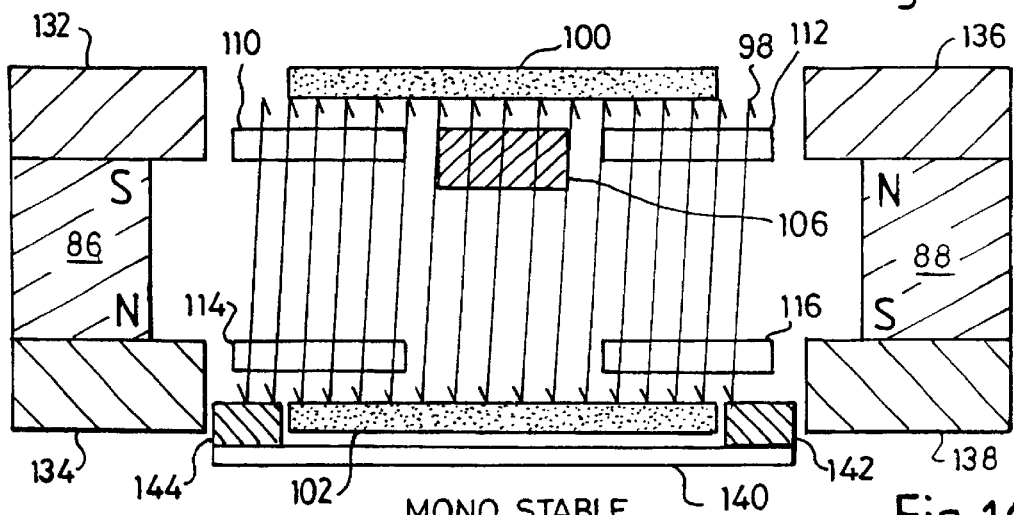
Fig. 16 MONO STABLE

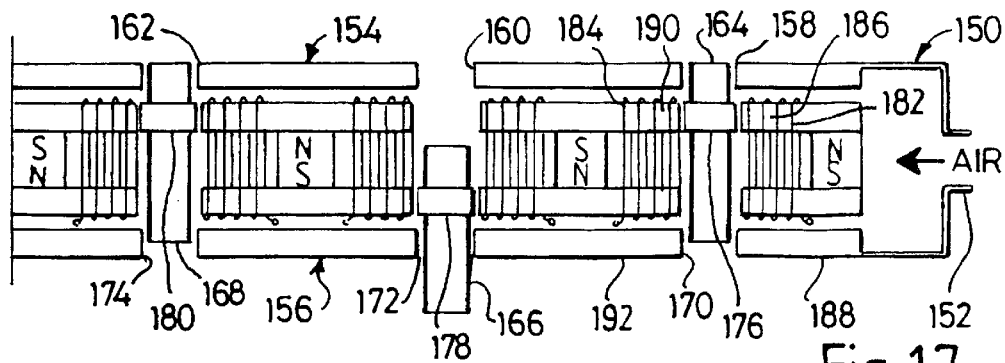
Fig. 17
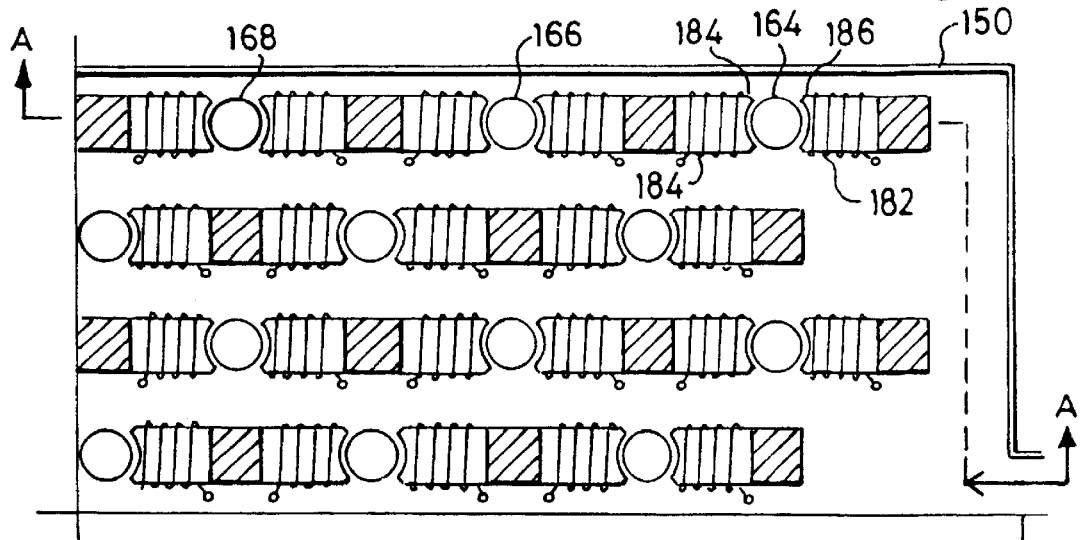
Fig. 18
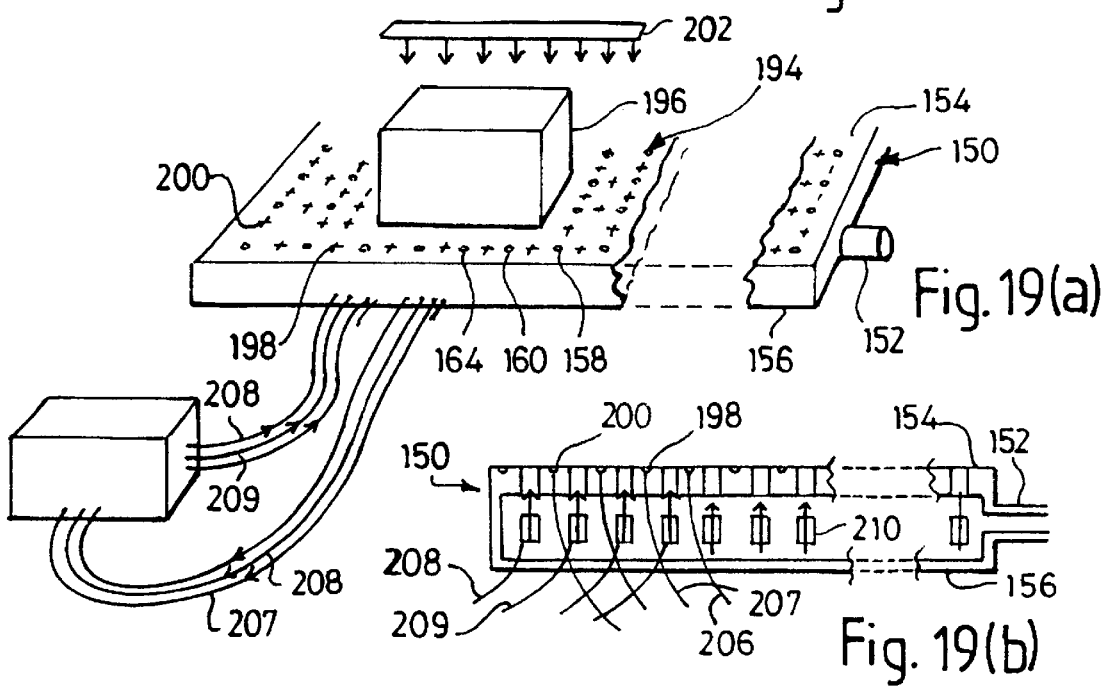
Fig. 19(a)
Fig. 19(b)

MAGNETIC DRIVES

FIELD OF INVENTION

This invention concerns magnetic drives, particularly but not exclusively for valves for controlling gas flow or fluid flow and for opening and closing electrical switch contacts.

BACKGROUND TO THE INVENTION

Magnetic attraction and repulsion is commonly employed as a motive force to operate devices such as valve closure members, pistons in cylinders to achieve a pumping action, and contactors and switches for opening and closing electrical circuits.

Such drives may have a bistable or monostable characteristic, and often employ a spring force to provide a restoring force and create a monostable operating characteristic.

Magnetic fields to achieve the operation are usually generated by causing an electric current to flow in a winding surrounding a ferromagnetic core or the like, which if the magnetic field is to collapse when the current flow ceases (as is usually required), is usually constructed from a magnetisable material having a low magnetic permanence.

Where valves control the flow of inflammable or poisonous gases or fluids, it is usual to design the magnetic drive therefor to be monostable and to have a so-called fail-safe characteristic in the event of a power failure. By fail-safe is meant that the valve will revert to a closed condition in the event that there is an electrical power failure.

The invention seeks to obviate the need to provide electric current continuously to maintain the operational state of a monostable device.

It is a particular object of the present invention to provide a bistable magnetic drive which does not require a continuous current flow to maintain it in either of its stable states.

Another object of the present invention is to provide a magnetic drive having a bistable characteristic, which can be readily modified to possess a monostable characteristic so that it will revert to (or remain in) one of its two states in the event of a power failure.

It is a further object of the invention to provide a mechanical device for altering the characteristics of a bistable magnetic device, to those of a monostable device.

It is a still further object of the invention to provide a digital fluid flow controlling valve, particularly for controlling the flow of gas or air.

It is a still further object of the invention to provide a digitally controllable gas flow control valve with a safety characteristic which reverts to a closed state in the event of the failure of a monitored source of energy such as an electrical current flow, a source of heat, or a source of light.

A further object of the invention is to provide pneumatic devices in which air or gas flow is under the control of valves controlled by such improved magnetic drives.

PRIOR ART

From U.S. Pat. Nos. 4,554,610, 4,386,823 and 3,772,540 are known magnetic drive devices having permanent magnet means, an armature displaceable between air gaps and an electromagnetic winding for driving the armature. In all cases, the axis of the winding lies parallel to the path of movement of the armature.

SUMMARY OF THE INVENTION

According to one aspect of the invention a magnetic drive device comprises a permanent magnet means generating magnetic flux, an armature mounted for movement enabling it to occupy either a first air gap in which the flux is in one direction, or a second air gap in which the flux is in the opposite direction, with a region of flux cancellation between the two air gaps, and at least one electromagnet winding having an axis generally perpendicular to the path of movement of the armature coil to which current can be supplied to adapt said at least one winding when energised to produce a magnetic flux in said one direction or the other, depending on the direction of the current, the flux from the winding increasing the flux density in the other air gap, thereby effectively shifting the flux cancellation region towards or into one of the two air gaps so as to produce a flux density gradient extending from one air gap to the other which will cause the armature to move into (or remain in) the air gap having the higher flux density, wherein the armature will continue to remain after the current flow ceases.

According to another feature of the invention, in use the winding both polarises the armature and changes the magnetic flux in the air gaps.

According to another aspect of the invention in a magnetic drive device as aforesaid further includes low reluctance flux concentrating means external to the electromagnet winding which provides a low reluctance external path for returning flux from one end to the other thereof when the winding is energised, thereby to increase the flux produced by the winding when energised, so as to magnify the magnetic flux available to effect movement of the armature.

The external flux concentrating means conveniently comprises at least one elongate member of magnetisable material which extends parallel to the magnetic flux in the air gap and generally perpendicular to the direction of movement of the armature and beyond the extent of its travel.

A magnetic drive device as aforesaid, (with or without the external flux concentrating means) may comprise four similar elongate magnetisable pole pieces arranged symmetrically in pairs, each pair occupying one of the two magnetic fields, wherein the air gap between the pole pieces in each pair defines the air gaps at the two extremes of the armature travel, and the two pairs of pole pieces serve to concentrate the internal magnetic flux into the two air gaps at opposite ends of the armature travel.

The combination of internal and external flux concentrating elements assists in defining the two stable positions of the armature and also assists in effecting the movement of the armature from one end to the other.

A pair of electrical contacts may be provided at one end of the armature travel which are electrically joined by being bridged by the armature, or by conductive means or a coating on the armature, when the latter is located at that end of its travel.

Likewise a pair of electrical contacts may be provided at the other end of the travel as well, and if required second conductive means or a coating is provided on the armature to ensure that the said other contacts are also bridged when the armature is at the other end of its travel.

By providing electrical contacts at either one or both ends of the armature travel, the drive is converted into an electrical switch in which one pair of contacts are bridged when the armature is at one end of its travel and the other pair are bridged when it is at the other end of its travel. The converted drive is therefore equivalent to an electromagnetic relay or contactor.

According to a further aspect of the invention a magnetic drive device as aforesaid may be contained within a sealed chamber and where electrical contacts are involved, at least part of the wall of the chamber may be formed from electrical insulating material to provide a region for conductive feedthroughs to terminals external of the chamber to allow electrical connection to be made to the contacts therein which, when the armature is in an appropriate position, are bridged thereby.

The chamber for example may be formed from plastics or glass or quartz.

According to another aspect of the invention, a magnetic drive device as aforesaid may include a further flux concentrator which is movable relative to the drive, so as to adopt a first position relatively close to the drive to reduce the flux density at one end of the armature travel, thereby causing the device to assume a monostable characteristic when the further concentrator is in that position, and is movable out of the first position into a second position where it has little or no influence on the flux density in the drive, to reinstate the bistable characteristic of the drive.

In an alternative arrangement, the said further flux concentrator may be permanently located very close to one end of the armature travel so as to produce a drive having a permanent monostable characteristic.

In one embodiment of the invention, a single permanent magnet may be employed at one end of an electromagnetic coil having located internally thereof two pairs of aligned, spaced apart pole pieces, defining air gaps at opposite ends of the armature travel, with or without external flux concentrating elements for increasing the flux density attributable to a current flowing in the electromagnetic coil, and instead of a second permanent magnet being located at the opposite end of the coil, an elongate member of magnetisable material is provided formed from material similar to that from which the pole pieces are formed, such that flux issuing from one of the two nearer internal pole pieces passes into and through the magnetisable material to issue from the other end thereof and pass into the other of two nearer internal pole pieces.

The elongate magnetisable member thus provides a return path for the flux and maintains the flux direction at each end of the armature travel in the same way as a second permanent magnet would have done, and thus removes the need for a second permanent magnet.

Further flux concentration can be obtained by providing field focusing pole pieces at opposite ends of the permanent magnet, and magnetisable elements at the opposite end of the coil (or at each end of the two permanent magnets where permanent magnets are located at both ends of the coil), wherein the pole pieces extend laterally of each magnet or length of magnetisable material and extend towards the pole pieces and flux concentrating elements located externally of the coil where provided.

In such an arrangement, any said further concentrator which is employed to produce a monostable characteristic in the drive, may also include pole pieces for fitting with small air gaps, between the said field focusing pole pieces and any internal pole pieces, and/or any external concentrator(s), at opposite ends of the coil.

An energy storing device such as spring means may be provided at one end of the armature travel, which absorbs energy derived from the final movement of the armature into its rest position at that end of its travel.

Preferably an energy storing device is located at both ends of the armature travel.

The stored energy in such an arrangement acts to accelerate the armature out of its rest position when a current flows in the electromagnetic winding causing the flux to collapse in the air gap occupied by the armature. This assists in the change of state of the device.

The invention also lies in a magnetic drive device which comprises magnet means producing first and second magnetic fields, the polarity of the first and second fields being opposite, and a magnetisable armature mounted for movement between the two said fields, the armature being magnetised South/North or North/South depending on which of the two fields it occupies and requiring considerable force acting perpendicular to the magnetic flux lines to shift the armature out of the influence of either field once it is aligned therewith, and a magnetic or magnetisable shunt is provided which is movable into a position in which the magnetic flux of one of the first and second fields becomes diverted therethrough, so as to cause the armature to either remain in the unaffected field or immediately to move, under the influence of the unaffected magnetic field flux, so as to occupy the unaffected field.

Shifting the armature from one end to the other of the device may be achieved by depleting the magnetic flux at the said one end and/or reinforcing the flux at the said other end. This may be achieved by causing an electric current to flow in an energising winding, which is located so as to influence the flux in one or other or both of the two fields. Two such windings may be provided or by movement into the vicinity of the device of a magnetised member or member of magnetisable material.

The armature is generally formed from magnetisable material, typically a ferro-magnetic material, and in order to reduce its mass, a split form of construction may be employed in which ferro-magnetic poles are located at opposite ends of the drive with a relatively small gap between the opposed magnetic pole faces, and the movable portion of the armature (also formed from magnetisable material) is designed so as just to fit in the small gaps between the opposed pole faces at the opposite ends of the drive, the movable element itself being secured to one end of a connecting rod which extends through one end of the magnetic drive to terminate externally of the drive in a valve closure member.

By constructing the armature in this way, the mass of the armature can be reduced to little more than the mass of the connecting rod, which itself can be hollowed so as to reduce its mass, and the solid piece of ferro-magnetic material forming the movable part of the armature is simply a small cross-section, but solid extension, of the connecting rod.

The connecting rod is preferably formed from non-magnetic material.

By reducing the mass of the armature in this way, the operating speed of the device (and any valve associated therewith) can be increased considerably relative to an arrangement in which a more massive armature has to be moved from one end of the drive to the other under the influence of the same magnetic field gradient.

Any of the magnetic devices as aforesaid may serve to operate a valve for controlling the flow of gas or air or liquid or provide the movement necessary to open and close electrical contacts of an electrical switch.

If a magnetic shunt is provided which is permanently in position, then it can be arranged that either the additional flux provided by the energising winding will be sufficient to overcome the non-shunted field at the other end of the device, or not to do so. If the induced flux is sufficient to move the armature from the non-shunted field into the shunted field, it will be seen that as soon as the energising current is removed (or significantly reduced), the armature will return to the non-shunted field end.

Another arrangement is one in which an additional electro-magnetic device is provided at the shunted field end of the device, with which the armature makes contact when moved into the shunted field. Preferably the additional device includes a magnetic core and the contact with the armature means that there is no air gap to reduce the flux density after contact is made. By providing a complete magnetic path without an air gap, the flux density is magnified many times. This arrangement therefore enables the armature to be attracted away from the non-shunted field by a high electric current flowing in the additional device, which can be reduced to a low current once the armature and device core make contact to hold the armature at the shunted field end.

Such an arrangement has a fail-safe characteristic in that if the small holding electric current fails, the residual flux gradient present in the drive will be such as to cause the armature immediately to move to occupy the non-shunted field where the static flux is highest.

The additional electromagnetic device may be a solenoid having a large number of turns on a magnetic core—eg a core of ferromagnetic material, so that only a small current will still produce a high magnetic flux.

A valve employing a magnetic drive device as aforesaid may be used for example to control the flow of inflammable gas to a burner or jet, wherein a thermocouple is located adjacent the burner or jet so as to be heated by a flame emanating therefrom to cause electric current to flow in any circuit connected to the thermocouple. Thus if the latter either produces, or controls the production of, a current for the holding solenoid at the shunted field end, the solenoid will produce a magnetic flux sufficient to retain the armature in contact therewith at the shunted field end provided the thermocouple remains heated by the flame. In the event of flame failure for any reason, the thermocouple cools, the holding current collapses and with it the magnetic flux linking the holding solenoid to the armature, thereby releasing the latter to move to the higher flux concentration at the other end of its travel.

An alternative arrangement which has similar fail-safe characteristics involves mounting the flux short circuiting device on a movable element, the position of which relative to the drive is controlled by the passage of an electric current or is dependent upon a particular voltage being present, or a gas or fluid pressure being exerted against the movable element, or any other physical parameter which changes in the event of some failure (such as flame failure in a gas burner) which will result in the movable element shifting the flux shunting device from a position in which a relatively large air gap exists between it and the magnetic flux at one end of the drive, into a position in which the shunting element diverts most or all of the said flux to significantly reduce the flux density at that end of the armature travel and cause the armature either to move to the other end of the drive to where the magnetic flux remains unaffected, or to remain at that other end.

Preferred forms of movable element are a bimetal strip, a piezo bender, a spring, a diaphragm or other device which will move under increasing or decreasing pressure.

In addition or instead of movement in relation to failure of a flame or other physical event, the mechanism which determines the instantaneous position of the flux shunting element can be adapted to respond to an increase in a monitored parameter such as temperature or pressure as well as a decrease. Thus the flux shunting device may be moved into position so as to direct the flux at one end of the drive, either in response to flame failure (in the case of a gas burner) or in the event of excess temperature.

Where a holding solenoid is to be provided, this may be located to advantage within the drive, at the end which is to be affected by the flux shunting element.

A magnetic device as described may be combined with a chamber to or from which fluid can flow depending on the position of a valve closure member relative to a valve seating surrounding an opening, which in one end position of the armature travel is closed by the valve closure member, and in the other end position of the armature travel, is unobstructed by the valve closure member.

In such arrangements it may be necessary to ensure that there is no chance of leakage of the fluid (which may be gas or liquid), into the device. This is particularly important where a flammable or explosive gas or liquid is involved. To this end the opening through which the connecting rod extends, between the magnetic drive and the valve closure member, may be sealed with one or more seals to prevent the escape of fluid (gas or liquid) from the chamber.

More preferably a diaphragm seal may be provided, instead of or in addition to sealing means surrounding the connecting rod, and the diaphragm material is selected so as to be impervious to the fluid to be controlled and is sufficiently flexible to permit linear movement of the connecting rod in response to movement of the magnetic armature.

In a preferred arrangement the diaphragm is generally circular in shape, includes a corrugated annular region to provide flexibility and permit movement of its central region relative to the circumference thereof, and is centrally perforated to allow the connecting rod to extend therethrough, but is sealed around the connecting rod, typically to a collar on the rod, the collar forming an integral part of, or being sealingly fitted to, the rod, and the periphery of the diaphragm is likewise bonded or otherwise sealingly joined to a larger diameter collar which is sealingly joined or integrally formed with an end wall of the magnetic drive assembly, which forms at least part of one wall of the fluid chamber into which the connecting rod and valve closure member extends.

When combined with a fluid containing chamber as aforesaid, and a flux shunting element is provided at one end of the drive device, typically the end thereof remote from the fluid chamber, a button operated setting/resetting device may be provided, proximate to the flux shunting element, for holding the latter away from the magnet assembly while the bimetal strip, piezo bender, or other mechanism which will normally hold the flux shunting element away from the magnetic field, establishes a sufficient force to stand off the flux shunting element after the button is released.

In addition or alternatively, an emergency button may be provided for forcing the flux shunting element into contact with the magnet components of the device to cause the valve to flip into its closed condition as a consequence of the collapse of the magnetic flux, in one of the fields.

Typically the collapse occurs in the field remote from the fluid chamber containing the valve closure device.

According to a further aspect of the invention, an array of a plurality of bistable flow control valves is provided associated with orifices which differ in size, and control means select different ones of the orifices to be open, either alone, or in combination with others, so that a range of differently sized openings through the array can be obtained, so as to regulate the flow of fluid there, the opening size being determined by the particular orifices which are open and in turn determining the rate of flow therethrough (for a given pressure differential), wherein each valve closure member is controlled by a magnetic drive device as aforesaid.

Preferably the different areas of the orifice openings which can be obtained, constitute each of a sequence of opening areas such that a progression of areas from zero to a maximum area value (when all the valves are open), can be obtained in a series of discrete steps.

According to another aspect of the invention, a plurality of magnetic drive devices as aforesaid may be employed to open and close each of a corresponding plurality of valve closure members for controlling the exit of fluid under pressure from manifold constituting a reservoir thereof, and the electromagnet winding of each drive is selectively connectable to a source of electric current, and programmable control means may be provided to establish connections to the source of current and the direction of current flow in the windings. The control means may be under computer control, programmable to open and close the valves in a sequence, or one or more patterns, or in a sequence of patterns.

Each valve may be associated with an orifice through which fluid such as gas or air can pass when the valve is opened.

The orifices may be equally spaced apart in a single line, or in a plurality of lines or in a regular pattern or series of patterns or pseudo randomly. The spacing between the orifices in the lines, and between the lines, may be the same, the lines may be parallel and the locations of the orifices along the lines may be such that they align in directions perpendicular to the parallel lines, so as to define a matrix of rows and columns of equally spaced apart orifices.

The orifices may exist in a flat plane such as in a large flat plate forming one wall of a manifold containing a fluid.

Preferably the fluid is air, under pressure.

The angle of the plane to the horizontal may be such as to define a support surface for objects located thereon.

The programmable control means may be programmed so as to cause air to be released by orifices below an object, situated thereover, so that the object will be lifted on a cushion of air. Once so lifted, the object can be moved freely, possibly without friction, across the surface.

By providing sensors to detect which of the orifices are in registry with the object and controlling the electrical connections to the electromagnet windings of the valve drives so as to continuously close valves not in registry with the object and open those that are, so the load supporting cushion of air can be made to travel with an object as the latter moves relative to the orifice. By so controlling the valves, air is only permitted to exit through orifices required to generate the load supporting air cushion, and the air flow through the orifice array is significantly reduced relative to air cushion support platforms in which air escapes continually from all the orifices.

An air cushion generating platform constructed to operate as aforesaid also generates less noise than one in which the air is released continuously from all the orifices.

It has been proposed to reduce the air loss from conventional air cushion generating platforms by providing each orifice with a normally closed air check valve, each operable into an open condition by the weight of an object located thereover, due to the downward thrust of the weight acting on vertically protruding probes linked to the valves.

An air cushion support platform constructed to operate in accordance with the invention has the advantage that the valves are individually controllable via the programming, there are no probes protruding upwardly from the surface of the platform, and there is no need for any physical contact between the underside of the elevated object and any part of the platform, once the air cushion has been generated therebelow.

The matrix of orifices may be located in two or more planes, which may be at right angles.

An air cushion conveyor may be constructed using a platform as described which extends in the direction along which objects are to be conveyed, and guides above the surface of the platform define a route therealong for the said objects, which when sensed, are elevated by the air released from thereunder.

The guides may also communicate with the manifold and have orifices therein.

In an alternative arrangement, the orifices may be arranged around a curved surface, and in particular may be in the wall of a passage in a manifold to which fluid under pressure is supplied, and a programme is run on the computer controlled valve opening and closing control means to release air from different ones of the apertures so as to generate a sound wave within the passage.

The latter may be cylindrical or rectangular in cross-section.

The manifold may be annular and have an array of orifices in the internal surface defining the opening therethrough, each controlled by a magnetic drive controlled valve as aforesaid.

The manifold may comprise part of the wall of a passage through which gases or air pass and by controlling the valves pulses of fluid can be injected into the flow of air or gas, so turbulence in the flow can be created or reduced as desired. The fluid is typically compressed air or gas.

Such an annular manifold may form part of the wall of the inlet or outlet of a turbine, or the exhaust or inlet of a jet engine, or the wall of a pipeline carrying gas or air, which may be subject to turbulence.

BRIEF DESCRIPTION OF THE DRAWINGS

The invention will now be described by way of example, with reference to the accompanying drawings in which:

FIG. 14 is a further bistable embodiment of the invention constructed so as to more precisely route the magnetic flux available from the permanent magnets;

FIG. 15 is a modification of the FIG. 14 arrangement in that a flux concentrator is provided which if moved close enough to the balanced magnetic circuit, will introduce imbalance in the flux pattern so as to introduce optionally (for example in a power failure mode) monostability into the operating characteristics of the device;

FIG. 16 is a further modification of the FIG. 14 arrangement in which the flux concentrator is located permanently in a flux imbalancing position, to create a monostable drive device.

FIG. 17 is a cross-section through a matrix array of orifices controlled by valves opened and closed by magnetic drives constructed in accordance with the invention;

FIG. 18 is a plan view of part of the array of FIG. 17;

FIG. 19 illustrates a control system for a valve controlled matrix array of orifices incorporating magnetic drives embodying the invention.

DETAILED DESCRIPTION OF THE PREFERRED EMBODIMENTS

Figure 1:
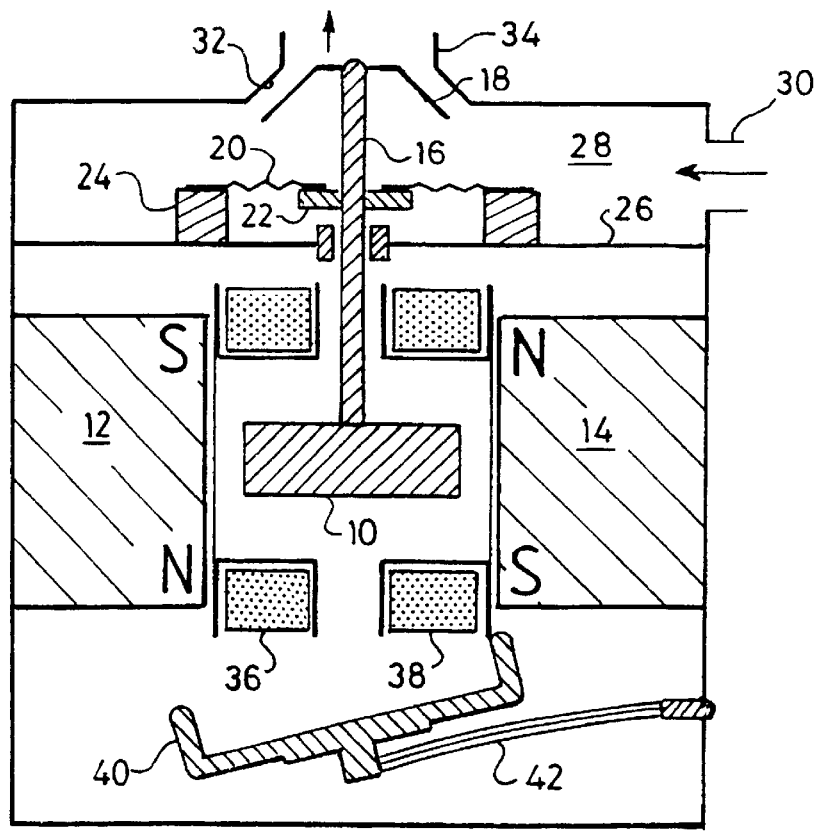
FIG. 1 is a cross-section through a magnetic drive which can be bistable or monostable depending on whether or not a flux short-circuiting element is in position.

In FIG. 1 an armature 10 is movable between the poles of a pair of magnets 12 and 14 arranged so as to produce two opposed fields at opposite ends of the travel of the armature. The latter is attached to a rod 16 to the upper end of which is attached a valve closure member 18. A diaphragm seal 20 extends between a collar 22 around the rod 16 and a second collar 24 attached to a wall 26 between the chamber 28 to which gas or liquid can be supplied via inlet opening 30 and which can exit when the valve closure member 18 is in the position shown displaced from a valve seat 32, by escaping through the outlet 34.

The armature 10 will attempt to align with one or the other of the two cross fields of the upper or lower end of the its travel and can be induced to move from one end to the other by passing a current through windings 36 and 38 in one direction or the other so as to either reinforce the flux at one end or reinforce the flux at the other.

Since reinforcement of magnetic flux in one of the cross fields will automatically reduce the flux in the other field, the effect of the current in the windings 36 and 38 will be to generate a flux gradient from one end of the armature travel to the other and the latter will tend to move towards the position of maximum flux density.

Since the device has a bistable characteristic, it is only necessary to supply a pulse of energy to the coils 36 and 38 to produce the flux gradient, and therefore the transition of the armature from one end to the other. Once the armature has moved into the position of maximum flux density, it will remain there, even if the current ceases to flow in the windings 36 and 38, which re-establishes the two cross fields as they were. The reason for this is that there is no tendency for the armature to move across the region of lower flux density between the two cross fields and it will tend to remain -in one or the other of the two extreme positions at the top or bottom of its travel.

As shown in FIG. 1, the armature is actually mid-way between its two extreme positions.

In accordance with the present invention, a flux concentrator and therefore short circuiting device 40 is mounted on a piezo bender 42 or a bi-metal strip such that the supply of appropriate electrical energy (potential or current) to the device 42 will cause the latter to be bent in the manner shown in FIG. 1 thereby holding the device 40 away from the end of the magnet 12 and 14.

In the event of the voltage or current failing, the piezo bender or bi-metal strip 42 will tend to straighten causing the device 40 to move closer to the two opposite poles of the magnets 12 and 14, and magnetic flux will tend to be attracted to two poles 42 and 44 and will be concentrated into the structure of the device 40 if the latter is formed from magnetisable material. Typically it is formed from a ferromagnetic material or other suitable magnetisable material.

The effect of the flux attraction will be to induce opposite magnetic poles in the poles 42 and 44 from those adjoining them in the magnets 12 and 14 causing attraction and closure of any gap between the device 40 and the magnets 12 and 14. The device 40 will therefore tend to clamp itself onto the lower end of the two magnets 12 and 14, and most of the flux which would normally extend between the two lower poles of the two magnets 12 and 14 will be concentrated into and extend through the device 40.

The net effect is that the magnetic flux density in the cross field at the lower end of the assembly of FIG. 1 will collapse to a very low level and a flux gradient will exist between the lower end of the assembly and the upper end.

If the armature 10 is already at the upper end, there will be no tendency for it to move.

If however the armature is at the lower end, the armature will tend to move up the gradient to the upper end of the assembly where the flux density is highest and to remain in that position.

Figure 2:
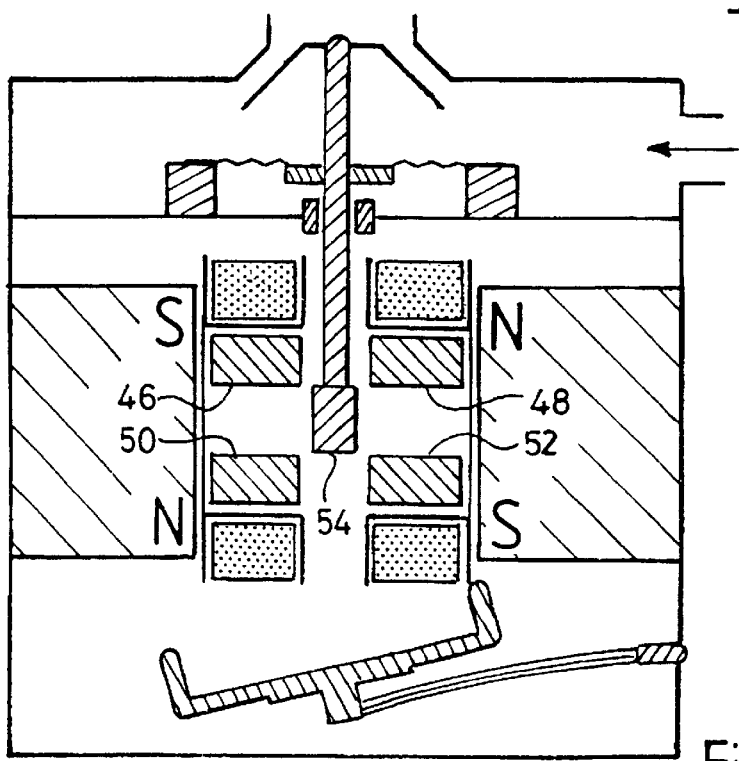
FIG. 2 illustrates a similar arrangement to that of FIG. 1, but in which the armature is split into a number of parts most of which are stationary so as to reduce the mass of the moving part of the armature.

FIG. 2 illustrates the same arrangement as shown in FIG. 1, but here the armature has been divided into four stationary parts 46 and 48 at the upper end and 50 and 52 at the lower end of the armature travel and the latter has been reduced to a small element of magnetisable material 54 which will just fit with a small gap between the elements 46 and 48 when the armature is at the upper end and between 50 and 52 when it is at its lower end of its travel.

The elements 46 to 52 essentially comprise pole piece extensions of the magnets 12 and 14.

The remaining parts of the device are as described in relation to FIG. 1.

Figure 3:
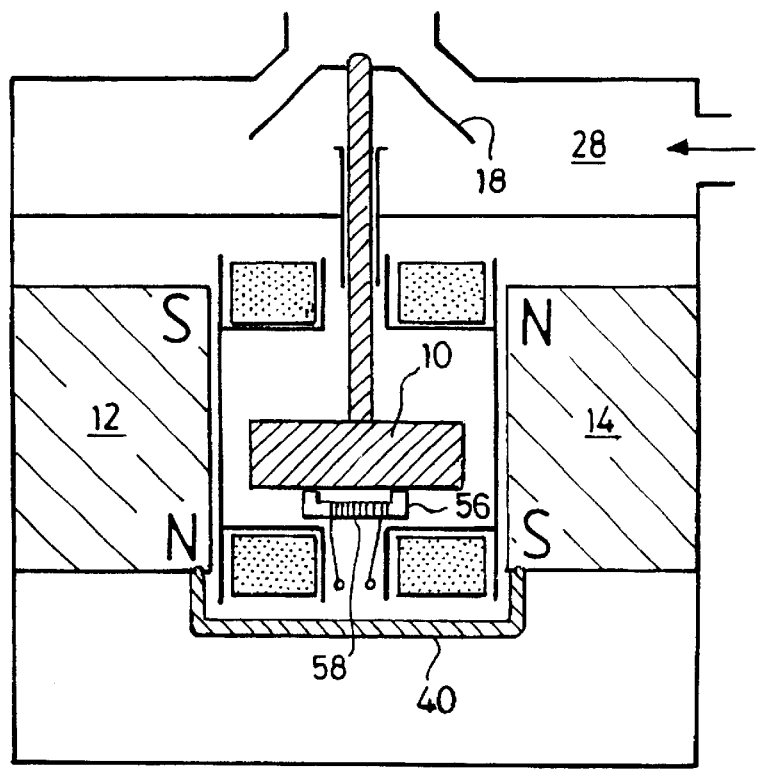
FIG. 3 is a further cross-section through a device similar to that of FIG. 1 in which electromagnetic means is provided for holding the movable armature in a position from it would normally move as a result of the reduction in magnetic flux by movement of the flux short-circuiting device.
Figure 4:
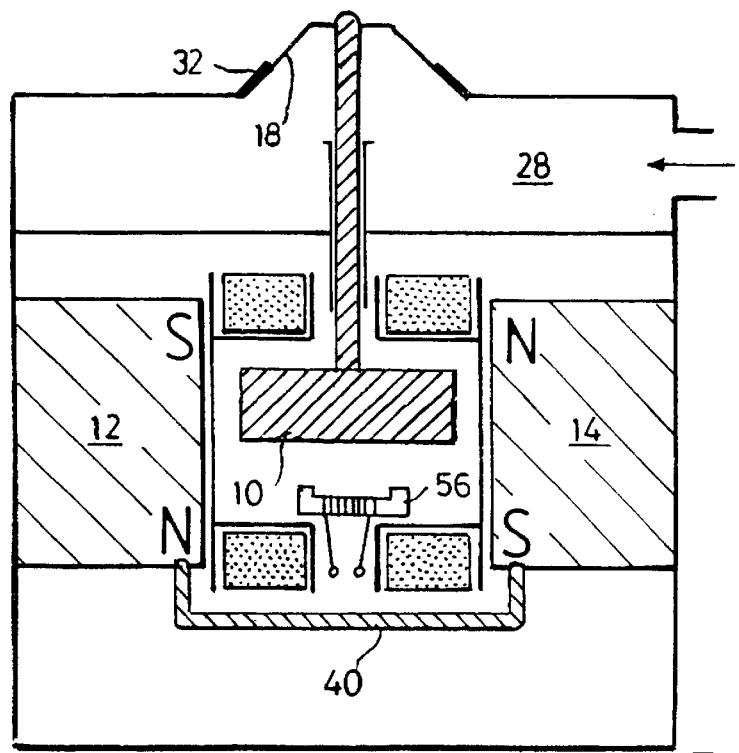
FIG. 4 illustrates the arrangement of FIG. 3 in which the electromagnetic holding device has been disabled allowing the armature to shift to the other end of the drive.

FIGS. 3 and 4 illustrate a modification to the FIG. 1 arrangement in which electromagnet 56 having a winding 58 is located at the lower end of the armature travel to engage the armature and provide a holding magnetic flux when the armature 10 is in its lowermost position as shown in FIG. 3.

The holding flux will only exist whilst a current flows in the winding 58, and to this end a current source exists to supply an appropriate current in the winding 58. If the latter is made up of a large number of turns of thin wire, only a very small current is needed to generate sufficient flux to hold the armature 10 against the pole pieces of the solenoid 56 and provided no air gap is introduced between the pole pieces and the armature 10, the closed path provided for the magnetic flux will hold the armature in the lower position as shown in FIG. 3.

In the event that the current flowing through winding 58 falls to a low value or collapses completely, the holding flux will also collapse and if a flux gradient exists in the region between the two magnets 12 and 14, the armature will move to the position of maximum flux density.

This movement is demonstrated in FIG. 4 in which the current in the solenoid winding 58 has been reduced to zero thereby enabling the armature to move to the upper end of the region of its travel where the flux density between the two magnets 12 and 14 is maximum.

The flux gradient will only exist in the event that the flux concentrator or short circuiting device 40 is located in contact with the lower ends of the magnets 12 and 14 as shown in FIGS. 3 and 4. The provision of this flux concentrating/short circuit device as a permanent or semi-permanent part of the assembly is an essential ingredient if the device is to be a monostable device having a home position in which the armature is at the upper end of its travel and a latched position where the armature is held at the lower end by virtue of a small current flowing in the coil 58.

Transition between the home position and the latched position is effected in the manner described in relation to FIG. 1 by means of a pulse of current of appropriate polarity flowing in the windings 36 and 38 so as to reinforce the field which is otherwise reduced by the effect of the short circuiting device 40 to cause the armature to move towards the solenoid 58. Once in contact therewith, the low current flowing in the solenoid winding 58 will maintain the armature in its lower position and the device is fail-safe in that if the current in the winding 58 collapses or simply reduces considerably, the armature will be free to move back up the flux gradient to the stable home position.

In each case the stable home position corresponds to the valve closure member 18 being firmly positioned against the valve seat 32 thereby closing off the exit from the chamber 28.

Figure 5:
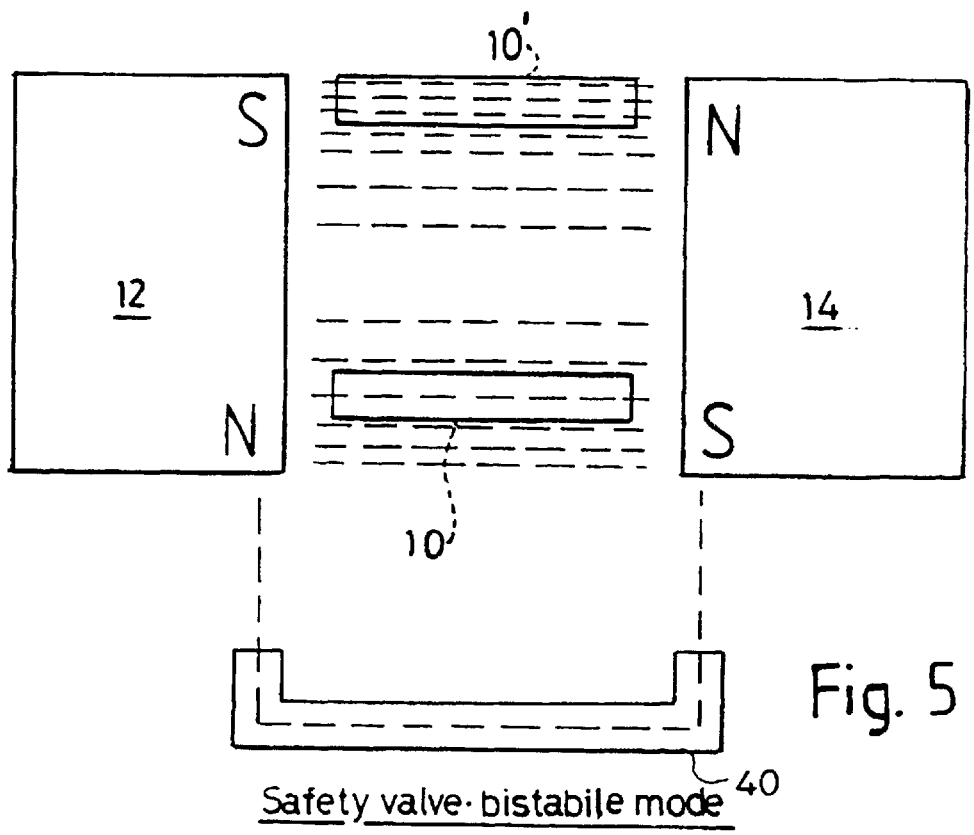
FIG. 5 shows the magnetic flux pattern of two magnets without a flux short circuiting device bridging one end of the magnets.
Figure 6:
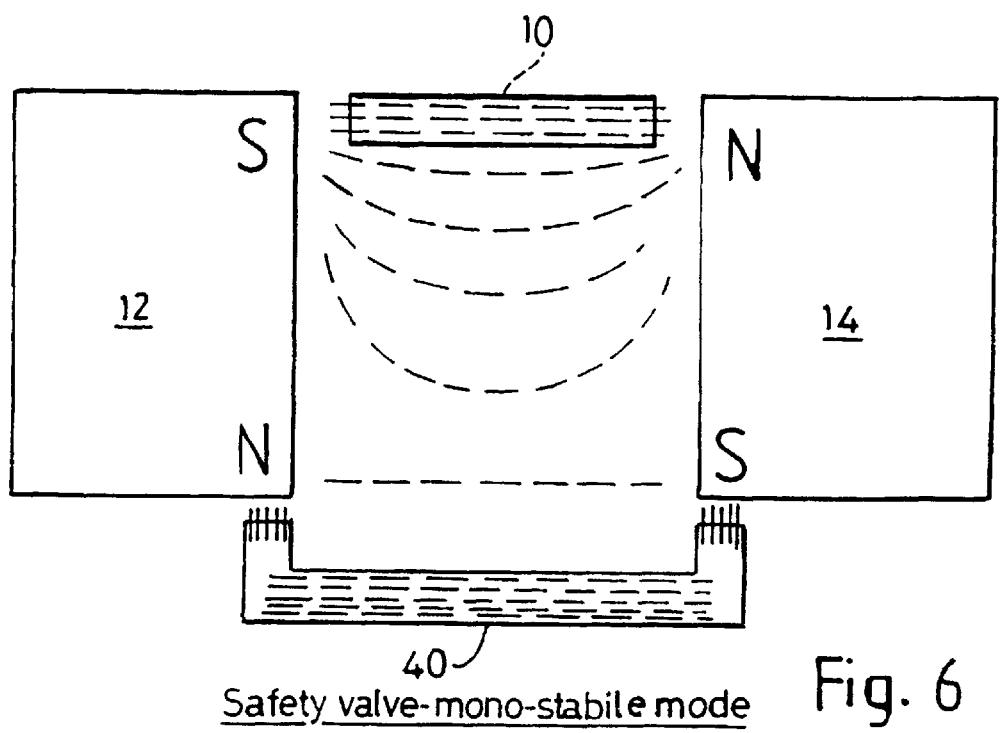
FIG. 6 shows the effect of short circuiting the flux at one end of the magnet assembly, thereby creating only one stable position for a magnetisable armature located between the two magnets.

FIGS. 5 and 6 show the flux lines between the magnets 12 and 14 with the short circuiting magnetisable concentrate 40 displaced from the assembly in FIG. 5 and close to if not in contact with the assembly as shown in FIG. 6.

Figure 7:
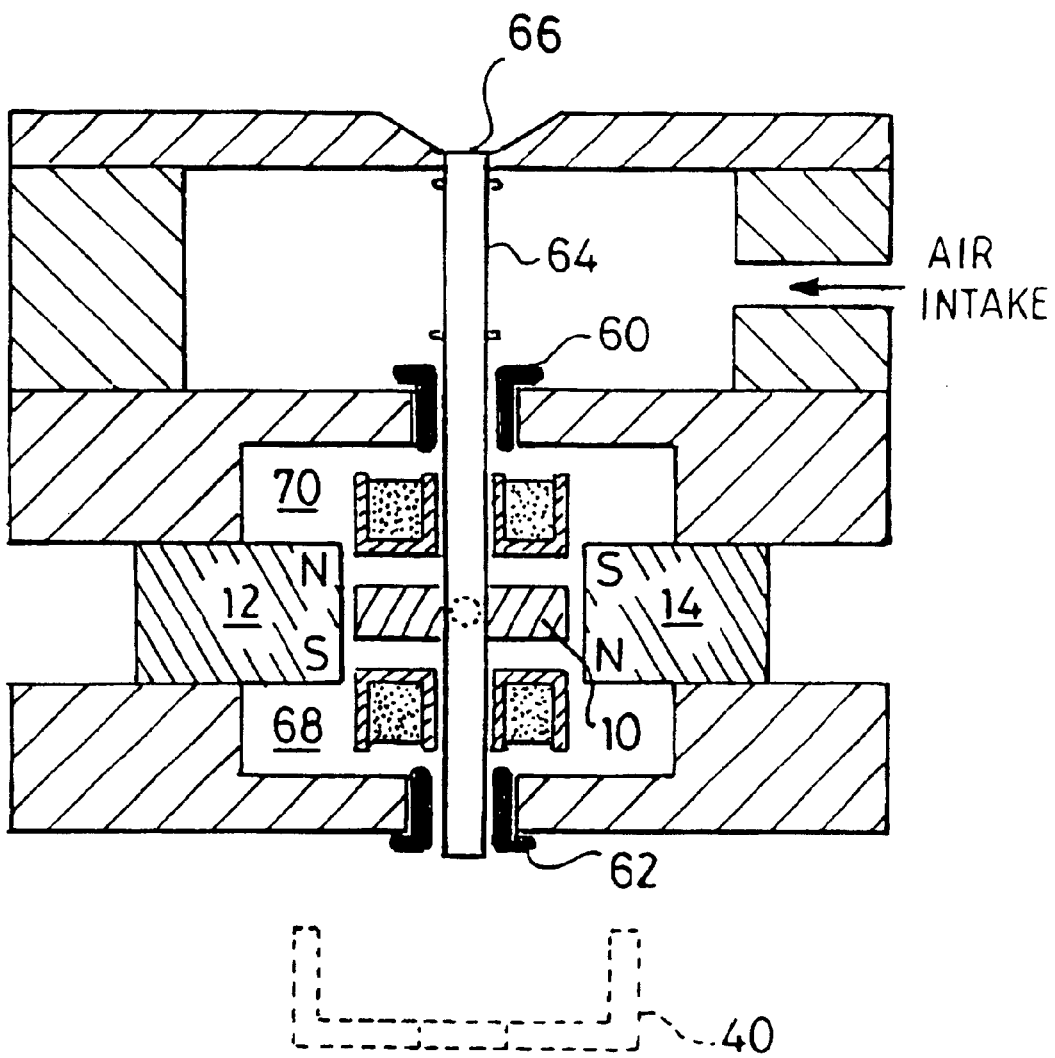
FIG. 7 is a schematic diagram of a drive for a fluid control valve, in which the device is a balanced magnetic drive having two stable equilibrium positions.

FIG. 7 shows the essential parts of a bi-stable valve constructed essentially as shown in FIG. 1, with seals 60 and 62 between the hollow rod 64 which terminates in the upper end with a valve closure device 66. A concentrator 40 may be located in the chamber 68 if desired so as to concentrate the flux into itself between the lower poles of the two magnets 12 and 14 as previously described to convert the device into a monostable valve. It will be seen that the concentrator 40 could be inverted and located in the other chamber 70 at the upper end of the assembly so as to reverse the flux gradient but in this event the device would not close in the event of power failure.

For the monostable operation to be successful, an additional electromagnetic device is necessary as described with reference to FIGS. 3 and 4 to hold the armature at the unstable end of its travel.

Figure 8:
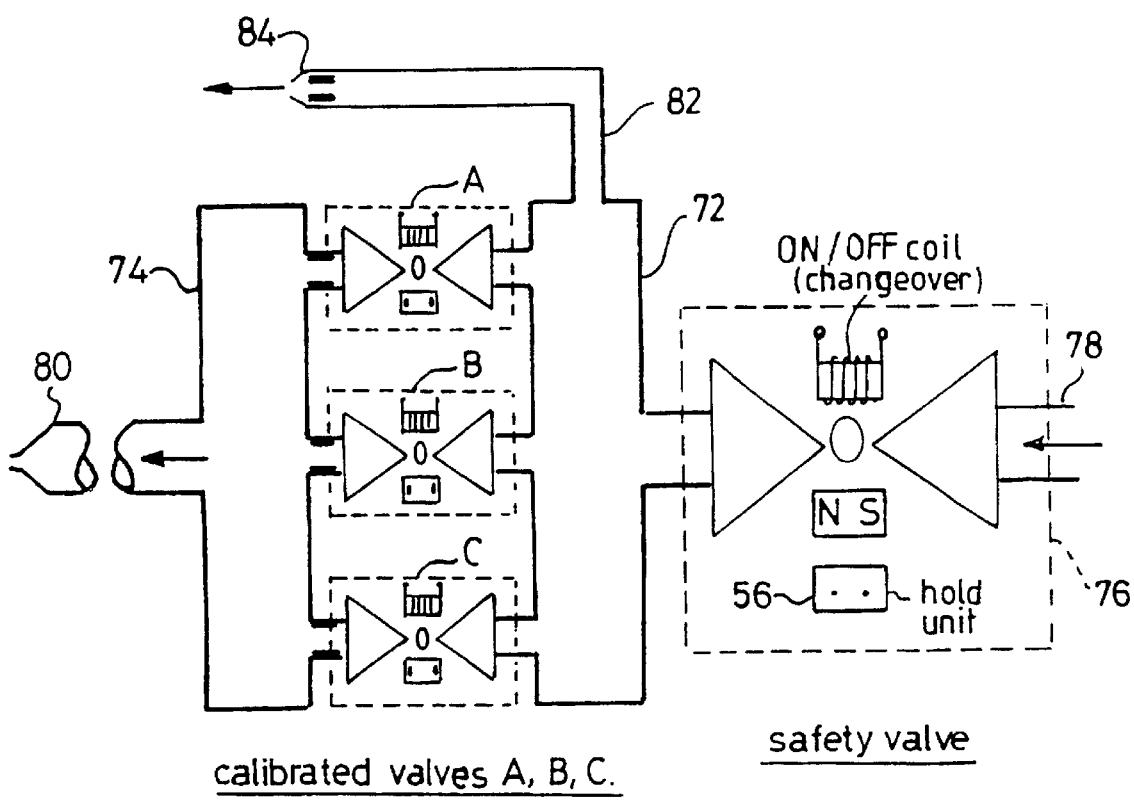
FIG. 8 illustrates how a number of such valves can be arranged to provide digital control of gas flow, in series with a monostable fail-safe valve.

FIG. 8 shows how three valves each having a different sized orifice can be arranged in parallel to provide digital control having eight discrete flow rates depending on which of the valves is open between a first chamber 72 and a second chamber 74. Each of the valves is operated by a a drive similar to that shown in FIG. 7 and fluid is supplied to chamber 72 via a monostable fail-safe valve such as is described in relation to FIGS. 3 and 4.

This valve is denoted by reference numeral 76.

The inlet to valve 76 may be gas pipe 78 supplying gas at moderate pressure for burning in a gas burner jet 80 which is supplied with gas from the second chamber 74. Depending on which of the valves A, B and C are opened, so the flow of gas to the burner 80 will be zero or maximum or any one of six different levels in between.

A small bleed pipe 82 feeds a pilot jet 84 from the chamber 72 and a bi-metal strip or other temperature sensitive device is located in the pilot flame to provide a holding current for the holding solenoid such as 56, 58 of FIGS. 3 and 4 as employed in the valve 76.

In the event of flame failure at the pilot light, the current in the holding device collapses and valve 76 closes.

As a safety measure, circuit means may be provided sensing the current in the holding device for valve 76 such that if this current fails, a current pulse is supplied to each of valves A, B and C to close each of these valves off.

The features of the device are set out in the list of features in the lower part of FIG. 8.

As observed on the drawing, any number of valves such as A, B, C may be employed, the more that are employed, the greater the number of possible intermediate steps which can be provided between the fully open gas flow mode and the fully closed gas flow mode of the valves.

The invention provides a simple digital gas flow control valve arrangement which contains no moving parts and can be arranged to fail safe in the event of power failure.

Figure 9:
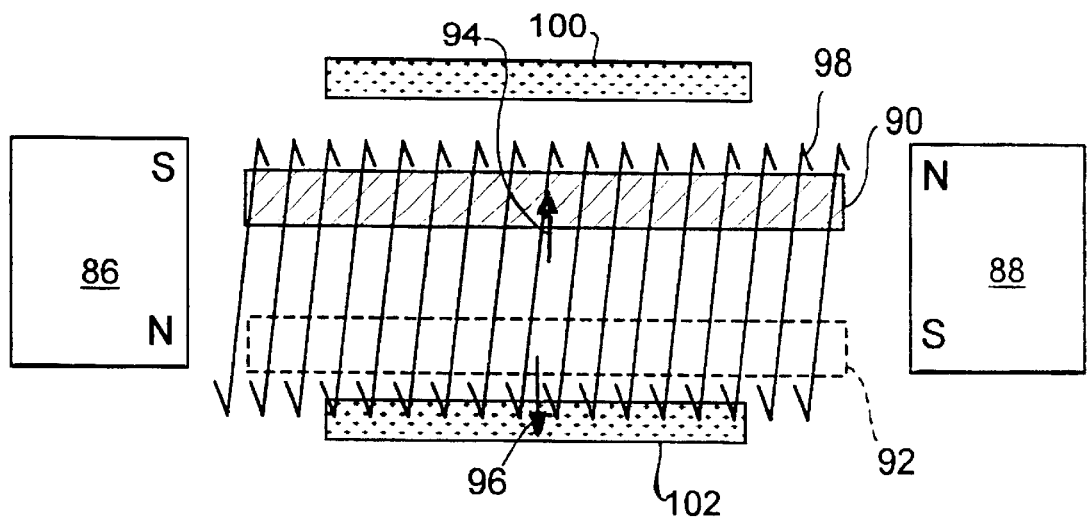
FIG. 9 is a diagrammatic illustration of a bistable magnetic drive., which incorporates two magnets and which constitutes another embodiment of the invention.

FIG. 9 illustrates a magnetic drive formed from two permanent magnets 86 and 88, and elongate armature 90 which can either rest in the upper position as shown or in the lower position shown in dotted outline at 92. The two positions of the armature coincide with the regions of maximum flux density in the complex field between the two magnets.

It will be appreciated that approximately half way between the two positions 90 and 92, the flux density will be effectively zero and will increase sharply in the directions of arrows 94 and 96. Beyond the positions 90 and 92, the flux density will tend to fall away.

The two positions 90 and 92 are therefore positions of equilibrium, albeit relatively unstable equilibrium in that if the armature is in one position, and is moved towards the other position by external means, there will become a point in time in which the influence of the magnetic flux associated with the other position will exceed that of the field from which the armature is moving and the latter will be attracted into the said other position.

Movement of the armature can be effected magnetically by locating an electromagnetic winding 98 between the two magnets 86 and 88. Passing a current through the winding in one sense will increase the magnetic flux density in the upper field and reduce the flux density in the lower field thereby shifting the position of zero flux density towards the lower field if not into and beyond the lower field depending on the flux density produced by the electrical magnet. Reversing the direction of current flow will reverse the effect on the flux in the upper and lower fields and shift the position of zero flux to the region of the upper field if not beyond it.

The net effect is to create a flux gradient extending from one armature position to the other depending on the direction of the current flow in the electromagnet 98 and the armature will always tend towards the region of higher flux density.

Once the armature has been moved from one field position to the other field position, current is no longer required to flow in the electromagnet to maintain the armature in the new position since on the collapse of the current, the flux pattern between the two magnets will be restored and the position of zero flux will again be located approximately midway between the armature positions causing the armature to remain in the position into which it has been moved.

In accordance with the invention, the flux produced by the electromagnet 98 can be significantly enhanced by locating magnetic concentrators 100 and 102 externally of the electromagnet coil 98 to provide a lower reluctance path outside the coil thereby effectively matching the low reluctance path within the coil (caused by the presence of the armature) and thereby increasing the flux available within the electromagnet to influence the magnetic fields between the two magnets 86 and 88.

The external concentrators 100 and 102 also attract flux from the permanent magnets 86 and 88 and by virtue of the magnetisation of the armature and the concentrators 100 and 102 by the permanent magnet fields and the flux generated by the flow of current in the electromagnet 98, the flux gradient from one end of the armature travel to the other is significantly enhanced, thereby improving the changeover characteristic of the drive for a given flow of current in the electromagnet 98.

Figure 10:
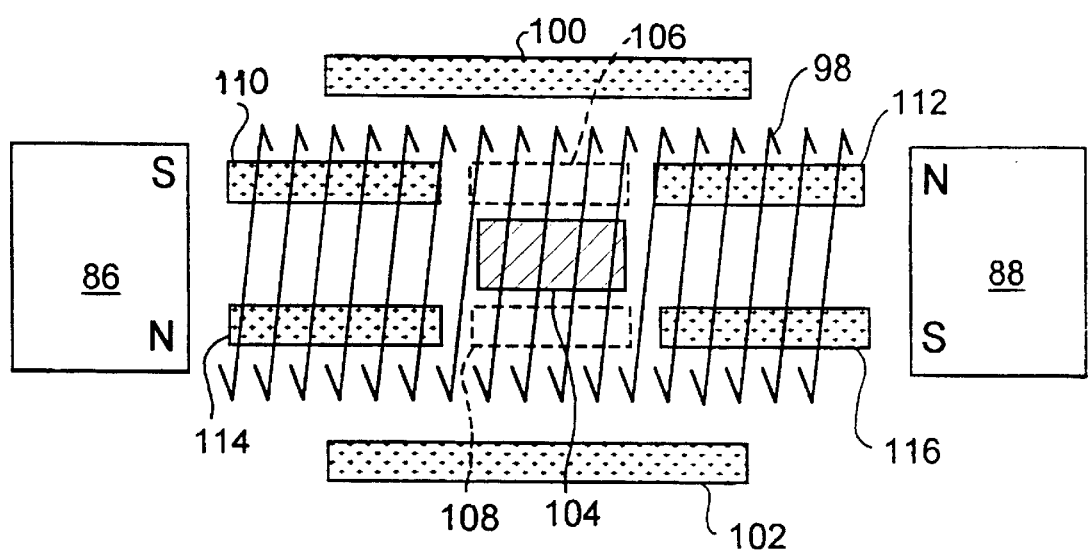
FIG. 10 is a similar illustration of a two-magnet bistable magnetic drive constructed as a further embodiment of the invention.

FIG. 10 illustrates a further refinement of the arrangement shown in FIG. 9 in which the armature 90 is now replaced by a shorter element 104 which as shown is in its midway position between the two ends of its travel denoted by the rectangular dotted outlines 106 and 108. The magnetic flux from the magnets 86 and 88 is concentrated into upper and lower air gaps at opposite ends of the armature travel by means of two pairs of pole pieces 110 and 112, and 114 and 116. In accordance with the preferred aspects of the invention, elongate concentrators 100 and 102 are also provided externally of the switching coil/electromagnet 98.

The device operates in exactly the same way as described in relation to FIG. 9, except that the armature is now less massive and requires effectively less energy to shift it from position 106 to 108 and vice versa. This means that the flux required to be generated by the electromagnet 98 can be reduced or for a given electromagnet and current, the force acting on the armature is considerably greater than would otherwise be the case leading to a more reliable operation of the drive or enabling greater force to be exerted from the armature to an external element which is driven by the armature.

Pole pieces 110 to 116 serve to concentrate flux in the two fields between the two permanent magnets into the upper and lower central air gaps and serve to better define the position of zero flux midway between those two air gaps in the non-energised condition of the coil 98.

The external flux concentrators 100 and 102 serve to enhance the flux available on energisation of the electromagnet coil 98 as previously described.

Either of the arrangements shown in FIGS. 9 and 10 can be adapted to form an electrical switch by providing electrical contact adjacent one or both of the positions of the armature and by forming the armature from electrically conductive material or mounting on or coating on the armature electrically conductive material which completes an electrical circuit between the contacts when the armature occupies the position adjacent the contacts.

Contacts may be provided at both ends of the armature travel so that two different electrical circuits are made depending on whether the armature is at one end or the other of its travel.

Figure 11:
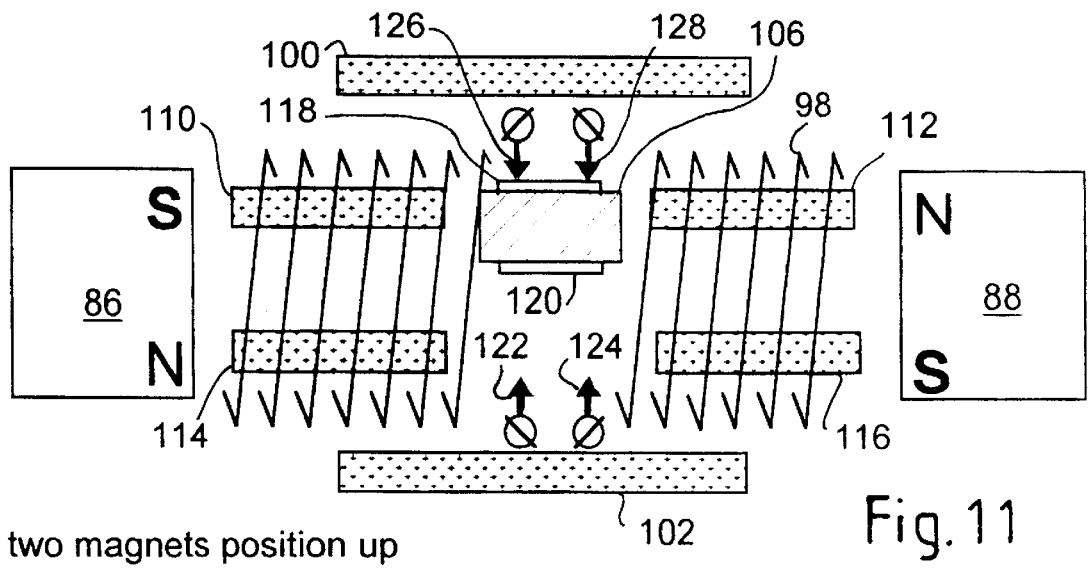
FIGS. 11 and 12 are similar views of the embodiment shown in FIG. 10, showing the armature in its two bistable positions wherein the armature short-circuits pairs of electrical contacts at opposite ends of its travel and converts the drive into a relay.
Figure 12:
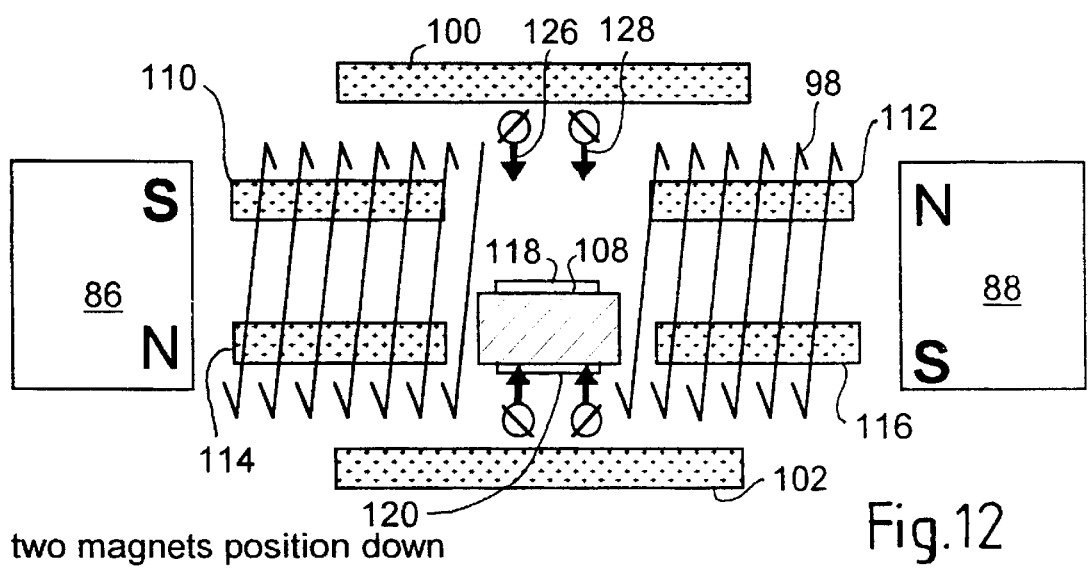

FIGS. 11 and 12 illustrate the FIG. 10 arrangement in which the armature 104 has conductive elements 118 and 120 located on opposite faces for making contact with a first pair of contacts 122, 124 at the lower end of its travel and a second pair of contacts 126, 128 at the upper end of its travel.

The armature 104 is shown in its upper position in FIG. 11 and in its lower position in FIG. 12.

Figure 13:
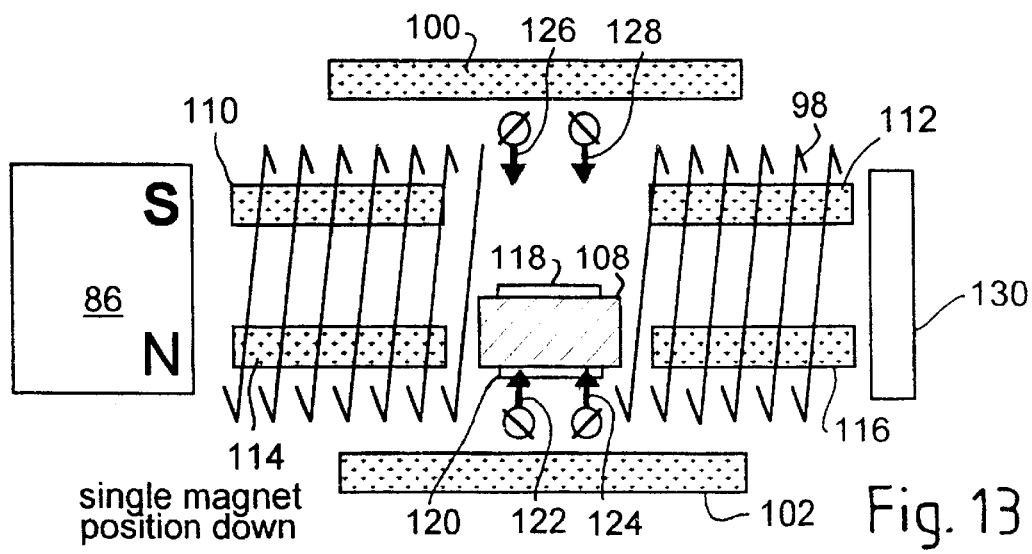
FIG. 13 is a similar view of another bistable embodiment of the invention, in which only a single element magnet is required, and wherein the armature is again shown cooperating with pairs of contact to perform the function of a relay.

It is to be understood that two permanent magnets such as 86 and 88 are not required and a drive can be constructed from single magnet such as 86 and a flux return member 130 as shown in FIG. 13. This comprises the arrangement of FIG. 12 in which the magnet 88 is replaced by the flux returning member 130. With no current flowing in coil 98, the flux from permanent magnet 86 will induce North and South poles as shown in the various magnetisable elements making up the circuit and armature 120 will remain in the lower position as shown.

Introducing a current of sufficient magnitude into the coil 98 will enhance the flux density between the upper pole pieces 110 and 112 and reduce if not eliminate flux between the pole pieces 114 and 116 causing the armature 120 to shift from the lower position shown to the upper position such as is designated in FIG. 11.

It will be seen that the second magnet 88 serves no purpose other than to reinforce the flux density in the air gaps between the pole pieces at opposite ends of the armature travel, and by providing a low reluctance path as by an elongate magnetisable member 130 in place of the second magnet 88, the flux pattern within and operation of the drive remains unchanged.

Although an arrangement incorporating a single magnet is shown in conjunction with an armature having conductive 118 and 120 for cooperating with contacts as described in relation to FIGS. 11 and 12, it is to be understood that the single magnet drive is applicable to any arrangement including monostable arrangements as described herein.

Since the flux emanating from the magnets 86 and 88 will tend to issue from the end faces of the magnets, a practical arrangement preferably includes pole pieces at the ends of the magnets (or in the case of a single magnet arrangement, at the end of the magnet 86 and at the end of the flux returning device 130) which extend laterally towards the armature and pole piece assembly within the electromagnet as shown in FIGS. 14, 15 and 16.

For simplicity a two magnet drive is shown based on the FIG. 11 arrangement and the armature shown at 104 is in its upper rest position at one end of its travel. An outline position at 105 denotes the other stable position for the armature. Similar reference numerals have been incorporated as used in FIGS. 10, 11 and 12 to denote the same items.

In accordance with this aspect of the invention, laterally extending pole pieces 132 and 134 are provided at the opposite ends of the magnet 86 and similar pole pieces 136 and 138 are provided at opposite ends of the other magnet 88. The pole pieces provide a low reluctance path for flux linking the magnets 86 and 88 with the other magnetisable members of the magnetic drive and this increases the flux density available to the drive from any given pair of magnets 86 and 88 (or single magnet 86).

The arrangement shown in FIG. 14 is a bistable arrangement since it is wholly symmetrical and the armature will remain in either the upper position at 106 or the lower position 108 as described in relation to FIG. 10, until triggered to move from one position to the other by an appropriate current flow in the electromagnetic coil 98.

The arrangement shown in FIG. 15 is a bistable drive which can be modified in an emergency to adopt a monostable characteristic by introduction of an external flux concentrating element 140 having pole pieces 142 and 144 which can be introduced between the pole pieces 134 and 138 and the external flux concentrating element 102 so as to significantly concentrate most of the flux which would otherwise link the armature (if in position 108 as shown), and lower pole pieces 114 and 116, whilst leaving the flux linking the other pole pieces 110 and 112 virtually unchanged. The flux gradient so produced will accelerate the armature 108 into the upper position 106 shown in FIG. 14 and the armature will tend to remain in that position all the time element 140 is located with its pole pieces 142 and 144 between the two magnets.

Passing an appropriate current through the electromagnetic coil 98 can overcome the flux short-circuiting effect of the element 140 to enable the armature 108 to be moved to the lower position while the current flows, but it will be seen that as soon as the current fails, the armature 108 will revert to the upper position for the reasons indicated above.

FIG. 16 shows the element 140 located in its proximate position between the poles 134 and 138, and demonstrates how the armature will normally adopt the upper position 106 when the element 140 is so positioned.

FIG. 17 shows a manifold 150 having an air inlet 152, an upper flat wall 154 and lower parallel wall 156 and a plurality of orifices 158, 160, 162, through which air can escape if open, but which can be closed by closure members 164, 166, 168 respectively if the latter are moved into their upper position (as shown for 158 and 162 respectively). Sealing (not shown) is provided between the closure members and the corresponding openings 170, 172 and 174 through which the lower ends of the closure members 164, 166, 168 can protrude (as does 166), when they are in their lowered position.

Similar sealing (not shown) is provided between the upper ends of the closures 164, 166 etc and the openings 158, 160 etc.

Each closure 164, 166 etc includes an integral magnetic armature 176, 178, 180 respectively, and the rest of the closure comprises a lightweight hollow tube of plastics material, or the like.

Each closure is movable into one or the other of its two stable positions by causing a short pulse of electric current of appropriate polarity to flow in windings such as 182, 184, around magnet poles such as 186, 188, and 190, 192 forming a magnetic drive device, and one such device is provided for each of the closures.

A plan view of the arrangement of FIG. 17 (with uper wall 154 removed) is shown in FIG. 18, and the line AA shows the section line used for producing FIG. 17.

A perspective view of the arrangement is shown in FIG. 19 in which the array of orifices 158, 160, 162 in the top surface 154 are denoted by reference numeral 194, and a rectilinear block of material 196 is shown located on the surface 154.

Air escaping from orifices in the array 194, below the object 196, creates a cushion of air which will elevate the block 196, and create an air bearing, permitting block 196 to be moved freely and without significant friction force, or contact with the surface 154.

The opening and closing of the orifices 154 is controlled by signals from light sensors (such as photodiodes) located in a similar matrix array between the orifices 194. One of these sensors is identified by reference numeral 198 and another by 200. A light source 202 above the surface 154 will normally illuminate all the sensors, and the signal produced by the sensors in that event is arranged to shift all the closures (such as 164) into their upper positions, to close off their respective orifices 158, 160 etc.

If an object such as block 196 is located over some of these sensors, as shown, light is inhibited from reaching those sensors, and the signals from these sensors are decoded and used to shift the closures of the orifices associated with the sensors in the group, into their lower positions. This opens the related orifices and permits air to escape below the block, and create an air cushion to lift the block out of contact with the surface 154.

By interrogating the sensor output signals continuously, or repetitively at a high rate, any lateral movement of the block can be rapidly ascertained, and the relevant closures moved to close off exposed orifices and open any now below the block.

A computer based control device 204 receives signals from each of the sensors 198, 200 etc along separate data paths 206, 207 etc. Operating currents for (or signals to cause current to flow in) the coils (such as 182, 184) of selected magnetic drives linked to orifice closures (164) etc, are supplied to the drives along current paths/data paths 208, 209 etc.

FIG. 19(*b*) is a scrap section through the manifold 150, and shows the sensors (198, 200 etc), orifices (158, 160 etc) and closures (158, 160 etc).

Current/data paths (206, 207 and 208, 209 are exemplified by similar reference numerals as were employed in FIG. 19(*a*). One of the magnetic drives is described by reference numeral 210.

Figure 20:
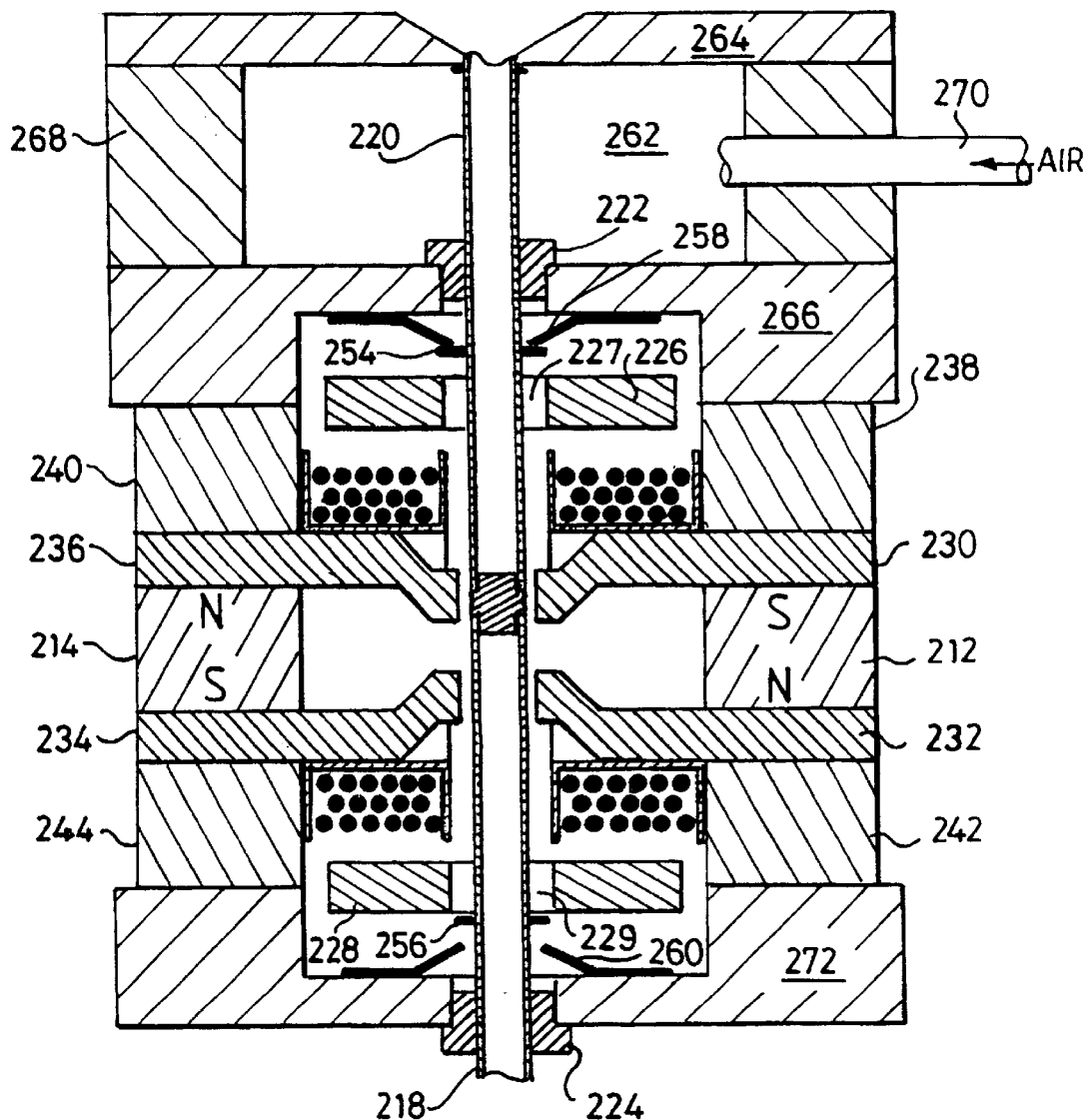
FIG. 20 illustrates a magnetic drive and valve which includes springs at opposite ends of the armature travel.

FIG. 20 is a cross-section through a pneumatic valve assembly operated by a magnetic device embodying the invention. This comprisrd two permanent magnets 212, 214, an armature 216 and hollow light weight aligned tubular extensions 218, 220 thereto which are guided in sleeve seals 222, 224. External magnetic shunts are provided at 226, 228. These are apertured at 227 and 229 to permit the extensions 218, 220 to extend therethrough. Four internal polepieces are provided at 230, 232, 234 and 236. Four magnet extensions are provided at 238, 240, 242 and 244 and two electromagnet windings are located around the internal polepieces as denoted by 246, 248.

A ring seal 250 partially engaged in an annular groove (not shown) in the exterior of the tube 220 serves to fully close off the orifice 252 when the armature is in its upper position (not shown), by engagement with the lower rim of the orifice 252.

The armature extensions 218, 220 carry radial flanges at 254, 256 which can engage dished annular springs 258, 260 respectively. The positions of the flanges 254, 256 relative to the armature travel and the springs 258, 260, are selected so that the latter are just engaged and compressed as the armature reaches its upper and lower rest positions respectively as determined by the magnet polepieces 232, 234 and 238, 240.

A chamber 262 is shown at the upper end of the assembly having upper and lower walls 264, 266 and an encircling side wall 268 which extends coaxially around the tube 220. This wall includes an inlet orifice through which a gas supply pipe 270 extends to convey gas (eg air) under pressure to the chamber 262.

The assembly is completed by a baseplate 272 which supports the lower spring 260 and the sleeve seal 224.

Conductors for conveying energising current to the windings 246, 248 etc, are not shown.

What is claimed is:

1. A magnetic drive device formed from a permanent magnet means generating magnetic flux, an armature mounted for movement enabling it to occupy either a first air gap in which the flux is in one direction, or a second air gap in which the flux is in the opposite direction, with a region of flux cancellation between the two air gaps, and at least one electromagnet winding having an axis generally perpendicular to the path of movement of the armature coil to which current can be supplied to adapt said at least one winding when energised to produce a magnetic flux in said one direction or the other, depending on the direction of the current, the flux from the winding increasing the flux density in the other air gap, thereby effectively shifting the flux cancellation region towards or into one of the two air gaps so as to produce a flux density gradient extending from one air gap to the other which will cause the armature to move into (or remain in) the air gap having the higher flux density, wherein the armature will continue to remain after the current flow ceases.

2. A magnetic device as claimed in claim 1, which further includes low reluctance flux concentrating means external to the electromagnet winding which provides a low reluctance external path for returning flux from one end to the other thereof when the winding is energised, thereby to increase the flux produced by the winding when energised, so as to magnify the magnetic flux available to effect movement of the armature.

3. A magnetic device as claimed in claim 1, in which four similar elongate magnetisable pole pieces are arranged symmetrically in pairs, each pair occupying one of the two magnetic fields, and the air gap between the pole pieces in each pair defines the air gap at each of the two extremes of the armature travel, the two pairs of pole pieces serving to concentrate the internal magnetic flux into the two said air gaps.

4. A magnetic device as claimed in claim 1, wherein a flux concentrator is located close to one end of the armature travel so as to produce a drive having a monostable characteristic.

5. A magnetic device as claimed in claim 1, wherein a flux concentrator is movable relative to the device, so as to adopt a first position relatively close to the device to reduce the flux density at one end of the armature travel, thereby causing the device to assume a monostable characteristic, and is movable out of the first position into a second position where it has little or no influence on the flux density in the device, so as to reinstate the bistable characteristic thereof.

6. A magnetic device as claimed in claim 1, wherein a single permanent magnet is employed at one end of an electromagnet coil having located internally thereof two pairs of aligned, spaced apart pole pieces, defining air gaps at opposite ends of the armature travel, and an elongate member of magnetisable material is provided at the opposite end of the coil formed from material similar to that from which the pole pieces are formed, such that flux issuing from one of the two nearer internal pole pieces passes into and through the magnetisable material to issue from the other end thereof and pass into the other of two nearer internal pole pieces, the elongate member of magnetisable material thus providing a return path for the flux to maintain the flux direction at each end of the armature travel in the same way as a second permanent magnet, in place of the elongate member, would do.

7. A magnetic device as claimed in of claim 1, having a pair of electrical contacts at one end of the armature travel, which are electrically joined by being bridged by conductive means moved into contact therewith by armature movement, to form a switch, wherein the armature comprises the conductive means, or the conductive means is a conductive layer, or conductive member, carried by the armature.

8. A magnetic device as claimed in of claim 1, having a pair of electrical contacts at one end of the armature travel, which are electrically joined by being bridged by conductive means moved into contact therewith by armature movement, to form a switch, wherein the contacts which are closed by movement of the armature, are situated at the same end of the armature travel to which it has moved to close same.

9. A magnetic device as claimed in claim 1 when within a sealed chamber.

10. A magnetic device as claimed in claim 9, wherein at least part of the wall of the chamber is formed from electrically insulating material to provide a region for conductive feedthroughs to terminals external of the chamber, to allow electrical connection to be made to the contacts therein.

11. A magnetic device as claimed in claim 1, in which energy storing means is provided at one end of the armature travel which absorbs energy derived from the final movement of the armature into its rest position at that end of its travel.

12. A magnetic device as claimed in claim 1, adapted to control the position of a closure member of a pneumatic or hydraulic valve, or the movable member of an electrical switch, effecting closure or opening of the contacts thereof.

13. A magnetic device as claimed in claim 12 in combination with a valve adapted to control the flow of an inflammable gas to a burner or jet.

14. A magnetic device and valve combination as claimed in claim 13, further comprising a thermocouple located adjacent the burner or jet so as to be heated by flame emanating therefrom to cause an electric current to flow in any circuit connected to the thermocouple, and wherein the latter either produces, or controls the production of, the holding current for the solenoid at the shunted field end, and is such as to produce a magnetic flux sufficient to retain the armature in contact therewith at the shunted field end provided the thermocouple remains heated by the flame, whereby in the event of flame failure, the thermocouple cools, the holding current collapses and with it the magnetic flux linking the holding solenoid to the armature, thereby releasing the latter and enabling it to move to the higher flux concentration at the other end of its travel.

15. A magnetic device and valve combination as claimed in claim 13, having a fail-safe characteristic in that the flux short circuiting device is mounted on a movable element, the position of which relative to the drive is controlled by a physical parameter which changes in the event of some failure (such as flame failure in a gas burner) which will result in the movable element shifting the flux shunting device from a position in which a relatively large air gap exists between it and the magnetic flux at one end of the drive, into a position in which the shunting element diverts most or all the said flux to significantly reduce the flux density at that end of the armature travel and cause the armature either to move to the other end of the drive to where the magnetic flux remains unaffected, or to remain at that said other end.

16. A magnetic device as claimed in claim 1, wherein the armature is formed from magnetisable material, and in order to reduce its mass, magnetic poles are located at opposite ends of the drive with a relatively small gap between the two pairs of opposed magnetic pole faces, and the magnetisable part of the armature is reduced in size so as to just fit in the small gap between the pair of opposed pole faces at opposite ends of the drive, the said magnetisable part of the armature being secured to one end of a low mass connecting rod which extends through one or both ends of the magnetic drive to terminate externally thereof.

17. A magnetic device as claimed in claim 16, when combined with a chamber to or from which fluid can flow depending on the position of a valve closure member relative to a valve seating surrounding an opening in the chamber wall, in which the position of the armature determines the position of the closure member and in one end position of the armature the closure member closes the valve, and in the other end position of the armature, the closure member is clear of the valve seating.

18. A magnetic device and chamber combination as claimed in claim 17, when combined with a plurality of similar said combinations, wherein the chambers comprise different regions of a common manifold and the orifices differ in size, and the drives are selected in such a manner that by opening different ones of the orifices, either alone, or in combination with other orifices, different effective overall orifice sizes can be obtained, so as to regulate the flow of fluid through the valves from the manifold, the overall open orifice area determining the rate of flow from the manifold for a given pressure differential.

19. A magnetic device as claimed in claim 1, in combination with a plurality of similar such devices, adapted to open and close each of a corresponding plurality of valves for controlling the exit of fluid under pressure from a manifold constituting a reservoir of the said fluid, and the electromagnet winding of each drive is connectable to a source of electric current, and control means is provided to establish the connections to the source of current and the direction of current flow in each winding.

20. A manifold and valve combination as claimed in claim 19, wherein the control means is under computer control, and the latter is programmable to open and close the valves in a sequence, or one or more patterns, or in a sequence of patterns, and in which each valve includes an orifice through which fluid, such as gas or air, can pass when the valve is opened.

21. A combination as claimed in claim 20, in which the orifices are equally spaced apart in a single line, or in a plurality of lines or in a regular pattern or series of patterns, or pseudo randomly.

22. A combination as claimed in claim 20, in which the spacing between the orifices in the lines, and between the lines, is the same, the lines are parallel and the locations of the orifices along the lines is such that they align in directions perpendicular to the parallel lines, so as to define a matrix of rows and columns of equally spaced apart orifices.

23. A magnetic device comprising magnet means producing first and second magnetic fields, the polarity of the first and second fields being opposite, and a magnetisable armature mounted for movement between the two said fields, the armature being magnetised South/North or North/South depending on which of the two fields it occupies and requiring considerable force acting perpendicular to the magnetic flux lines to shift the armature out of the influence of either field once it is aligned therewith, wherein a magnetic or magnetisable shunt is provided which is movable into a position in which the magnetic flux of one of the first and second fields becomes diverted therethrough, so as to cause the armature to either remain in the unaffected field or immediately to move, under the influence of the unaffected magnetic field flux, so as to occupy the unaffected field.

24. A magnetic device as claimed in claim 23, which includes an electromagnet winding which when current is supplied thereto produces magnetic flux in one direction or the other, depending on the direction of the current flow, the flux from the winding increasing the flux density in one of the air gaps and reducing it in the other.

25. A magnetic device as claimed in claim 24, wherein the magnetic shunt is permanently in position and the additional flux provided by the energising winding is selected to be sufficient to overcome the non-shunted field at the other end of the drive, whereby the induced flux is sufficient to move the armature from the non-shunted field into the shunted field, but as soon as the energy current is removed or significantly reduced, the armature will return to the non-shunted field end.

26. A magnetic device as claimed in claim 23, wherein an additional electromagnetic device is provided at the shunted field end of the drive, with which the armature makes contact when moved into the shunted field.

* * * * *